United States Patent

[11] 3,624,470

| [72] | Inventor | Richard A. Johnson<br>Murrysville, Pa. |
|---|---|---|
| [21] | Appl. No. | 5,849 |
| [22] | Filed | Jan. 26, 1970 |
| [45] | Patented | Nov. 30, 1971 |
| [73] | Assignee | Westinghouse Electric Corporation<br>Pittsburgh, Pa. |

[54] SINGLE-PHASE MOTOR-STARTING CONTROL APPARATUS
5 Claims, 4 Drawing Figs.

[52] U.S. Cl. .................................................. 318/221 G, 318/227
[51] Int. Cl. .................................................. H02p 1/44
[50] Field of Search .......................................... 318/221 R, 221 G, 227

[56] References Cited
UNITED STATES PATENTS

| 3,529,221 | 9/1970 | Reinke | 318/227 X |
| 3,538,410 | 11/1970 | Welker | 318/221 E |
| 2,502,099 | 3/1950 | Lindfors | 318/221 G |
| 2,929,978 | 3/1960 | Petrocelli | 318/221 R |

Primary Examiner—Gene Z. Rubinson
Attorneys—A. T. Stratton, F. P. Lyle and G. H. Telfer ABSTRACT: A starting circuit for a single-phase electric motor is provided that includes solid-state circuit means connected with the auxiliary winding for developing a signal proportional to motor speed and controlling an electromechanical relay that permits application of line power to the auxiliary winding only upon predetermined speed conditions.

PATENTED NOV 30 1971

WITNESSES
Bernard R. Giegney
James F. Young

INVENTOR
Richard A. Johnson

BY Gordon H. Telfer
ATTORNEY

SINGLE-PHASE MOTOR-STARTING CONTROL APPARATUS

BACKGROUND OF THE INVENTION

1. Field of the Invention

The present invention relates to speed-sensitive switching apparatus, particularly for controlling the supply of power to the starting winding of a single-phase electric motor.

2. Description of the Prior Art

A single-phase electric motor normally has two windings, the main or running winding and an auxiliary or starting winding, which are physically displaced from each other on the stator of the motor and which carry currents that are displaced in phase. When such motors are started, both windings are connected to a single-phase supply line and, because of the phase displacement between their currents, starting torque is developed. When the motor has accelerated to a sufficiently high speed, the starting winding is desirably disconnected from the supply line for more efficient operation of the motor. The disconnection of the starting winding is achieved by a speed-sensitive switching device generally located in the starting winding circuit.

Commonly used switching devices in starting circuits include centrifugal switches which disconnect the starting winding by means of contacts in a stationary portion of the switch which are activated at a predetermined rotational speed of the motor. Other prior art means include current-responsive and voltage-responsive electromechanical relays connected to the starting winding.

In the case of motor-starting switches, as well as in many other applications, there has been considerable interest in avoiding the use of mechanical switches by some solid-state switching means that provides higher reliability and other advantages.

Among the advantages sought through the use of solid-state switching is the ability to select pull-in and dropout speeds as may be desired by the users rather than having them built into the motor by the characteristics of the speed-sensitive switch. Furthermore, it has been found that with prior voltage or current-sensitive relays the dropout and pull-in points vary greatly with the relay mounting position, motor load, and line voltage variations. Voltage-sensing relays have a normally closed contact configuration, i.e., they close when power to the motor is removed. This can cause regenerative braking that is sometimes dangerous. Centrifugal switches are generally reliable only for motors of about 0.5 HP or less.

In Petrocelli U.S. Pat. No. 2,929,978, Mar. 22, 1960, the auxiliary winding circuit includes a solid-state switch, a hyperconductive negative resistance adjustable breakdown device, for blocking current flow in the auxiliary winding circuit. The normal breakdown voltage of the switching device is greater than the magnitude of the potential across the device from the power supply. Circuit means is provided for producing a control potential to the switching device to reduce the breakdown voltage level of the device to a valve below the magnitude of the power supply potential. At normal running speed this control potential is prevented from being applied to the switching device by a signal developed by a speed-responsive apparatus that produces a blocking voltage.

The ultimate desirability of schemes such as are disclosed by Petrocelli in which the switching elements are all solid state is clear. Presently however economic considerations and the performance capability of those components commercially available limit the immediate application of this concept. In particular, a solid-state switch (e.g. of the SCR or thyristor type) that is capable of handling typical inrush currents of about 50 or 60 amperes, as is encountered in motor starting applications, is quite expensive compared with prior switches and those available can sustain such currents for only limited periods which can often be exceeded by a motor in a locked rotor condition. Furthermore, some further expense is encountered by the fact that the circuits with all solid-state switching elements require some means, such as a transformer, for isolation between the voltage across the starting winding and the line voltage.

SUMMARY OF THE INVENTION

The present invention provides an economical, yet effective, combination of solid-state and electromechanical circuit elements for single-phase motor-starting control. An electromechanical relay is used as the main power switching element for the application and removal of line voltage to and from the auxiliary motor winding. However, in the combination of this invention, this relay is not required to perform the speed-sensing function (by sensing current or voltage of the start winding) which has been the major cause of imprecision and unreliability of prime schemes employing current- and voltage-sensitive relays. Nor is it limited to very small motors as in the case of centrifugal switches. Here there is provided solid-state circuit means for sensing voltage (or current) across the auxiliary winding, which is a function of motor speed, and developing a signal for application to the coil of a simple electromechanical relay for its operation upon occurrence of predetermined motor speed.

The relay in preferred forms of the present invention is normally open and closes only for starting purposes. The circuitry may be variously mounted with the motor without affecting its speed-sensing capability and could be made adjustable by substitution or variation of resistive elements. A locked rotor condition can be tolerated by the inventive combination. No separate component for isolation such as a transformer is required in preferred forms of the invention. The required elements are competitive in cost with prior voltage and current-sensing relays and are more economical than schemes that use a solid-state switch as the main switching element.

DESCRIPTION OF THE PREFERRED EMBODIMENTS

Figure 1:
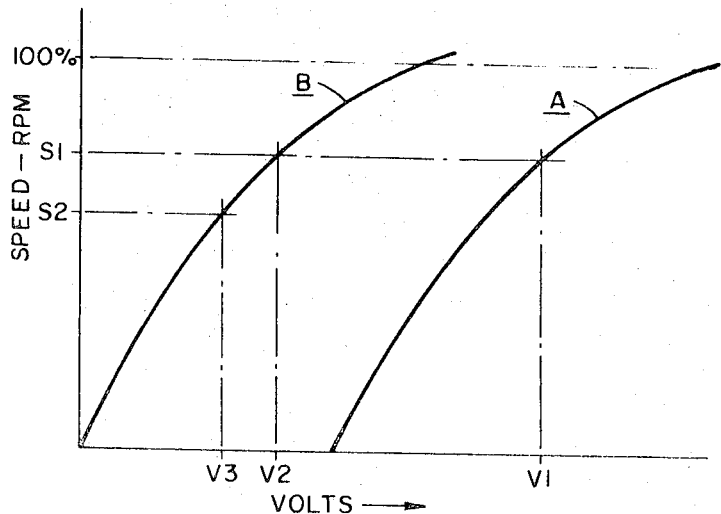
FIG. 1 is a set of curves illustrative of the operation of circuit combinations in accordance with this invention.

FIG. 1 shows the relationship of voltage across the starting winding of a single-phase motor to motor speed. The motor is initially started at zero speed when the start switch closes. The voltage across the start winding increases along curve A as the motor accelerates until it is desired to open the start switch at a speed indicated at S1. This corresponds to a voltage of V1. Immediately upon opening the start switch, the start winding voltage drops to V2 on curve B and follows this curve as the motor pulls up to rated speed on the main winding alone. Should the motor speed decrease to a point indicated at S2, and winding voltage V3, it is desired to reclose the starting switch to increase the motor torque and once again reach full motor speed. Speeds S1 and S2 are respectively the dropout and pull-in speeds of the motor.

Figure 2:
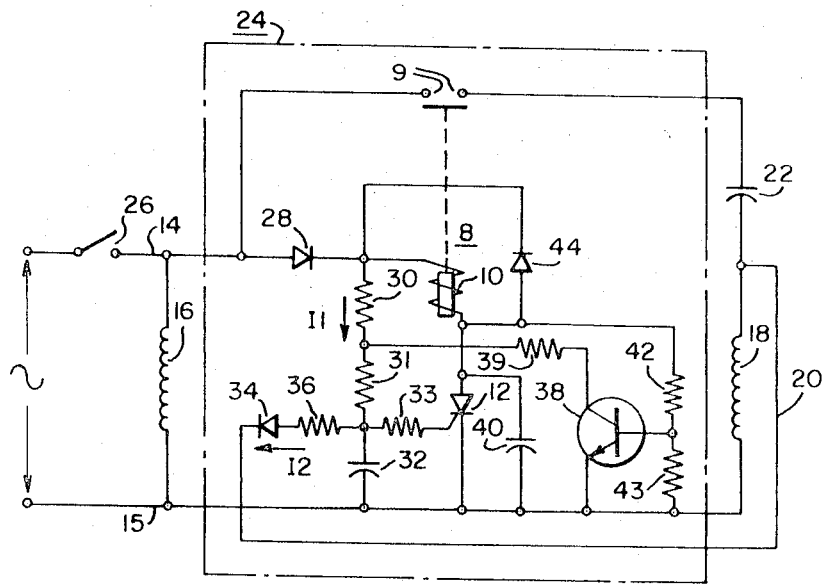
FIGS. 2, 3, and 4 are exemplary embodiments of starting circuits in accordance with this invention.

In the circuit of FIG. 2 a series combination of an electromechanical relay coil 10 (of relay 8) and a solid-state switching device 12 is connected to the line voltage conductors 14 and 15. Coils 16 and 18 represent the main and auxiliary windings, respectively, of the motor. The main winding 16 is also connected across line voltage conductors 14 and 15. The auxiliary winding 18 (in this example in series with a starting capacitor 22) is connected at one side to line voltage conductor 15. The other side of the auxiliary winding 18 is connected to the other line voltage conductor 14 only through contacts 9 of relay 8. Also, that side of the auxiliary winding is connected by a conductor 20 into the starting control circuit 24 enclosed by the dashed line.

The starting control circuit includes a number of elements as will be described by way of example. The solid-state switching element 12 may be of various types (e.g., 4-layer diode, thyristor, triac, etc.) but it can be seen that it need not have the current handling capability (hence it may be smaller and cheaper) than a similar type of solid-state component used directly in the auxiliary winding circuit in place of relay 8. The general concept of operation of the circuit 24, which may be implemented in a wide variety of ways, is to have the solid-state switch 12 operate in response to an electrical parameter (voltage in this example) of winding 18 (which parameter is a function of motor speed) to control the current through relay coil 10 and hence the closing of contacts 9, only upon predetermined speed conditions.

When the line voltage is initially applied, (e.g. switch 26 is just closed) the solid-state switch 12 is biased off, that is, the line voltage is insufficient to cause breakdown thereof. Also, initially, the relay 8 is open and the voltage is not applied across the starting winding 18. Positive rectified current I1 is provided by a current rectifier 28 through series resistors 30 and 31 to filter capacitor 32 and then turns on the switching device 12 which in this instance is a gated semiconductor switch, commonly referred to as a thyristor or controlled rectifier, through a resistor 33. The current drawn through switch 12 then causes relay 8 to close energizing the start winding 18 and voltage develops across that winding.

A negative rectified current I2 proportional to the auxiliary winding voltage is fed back from one side of start winding 18 to capacitor 32 through conductor 20, diode 34 and a resistor 36. Capacitor 32 filters these two current signals (I1 and I2) with a difference signal going through resistor 33 to drive the thyristor 12. As the motor accelerates, the negative current I2 increases in magnitude until it approximately equals I1 and thyristor 12 is turned off, i.e., there is insufficient signal at the gate of thyristor 12. The ratios of resistor 36 to resistors 30 and 31 determines the voltage at which the thyristor 12 no longer conducts, at which time the relay 8 opens.

Latching feedback is provided to give the desired hysteresis between opening and reclosing the output when the anode voltage increases and transistor 38 is turned on. As transistor 38 conducts, much of the positive rectified current I1 is shunted through resistor 39 decreasing the drive for thyristor 12. Resistor 39 is chosen in conjunction with resistors 30, 31 and 36 such that the auxiliary winding voltage must decrease below V3 before positive drive to the gate of thyristor 12 is again provided.

Other components illustrated in FIG. 2 include a capacitor 40 connected directly across the anode and cathode of switch 12 to act as a voltage transient suppressor, resistors 42 and 43 which determine the current level at the base of transistor 38, and diode 44 which acts as a current-circulating diode connected directly across relay coil 10.

Since the dropout and pull-in points S1 and S2 of FIG. 1 are determined mainly by resistors 30, 31, 40 and 36, the circuit is largely insensitive to line voltage variations. The auxiliary winding feedback voltage shifts in proportion to line voltage, thus yielding dropout and pull-in points corresponding to set speeds rather than absolute voltage values. Furthermore, when the line power is removed the output relay 8 cannot be closed. Thus, the relay 8 cannot close to cause regenerative motor breaking when the motor is turned off.

Figure 3:
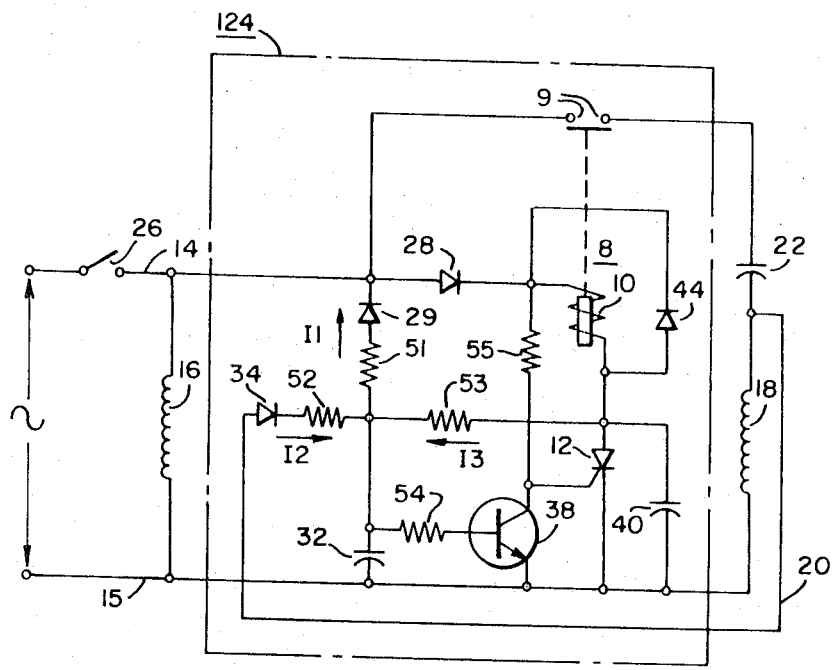

An alternative form of the invention is shown in FIG. 3. Here the starting control circuit 124 is generally similar to that labeled 24 in FIG. 2 and some corresponding (though not necessarily identical) elements are identified by the same reference numerals. A principal difference is that transistor 38 is used here to provide current gain for driving the thyristor 12. The output relay 8 is activated when transistor 38 is off allowing gate drive thyristor 12 through resistor 55.

Voltage feedback conductor 20 is here connected to the same side of winding 18 as is line conductor 15. When the positive rectified current I2 through resistor 52, which is proportional to the auxiliary winding voltage exceeds the negative rectified current I1 through resistor 51 which is in series with additional diode 29, the voltage across filter capacitor 32 becomes positive and transistor 38, through a bias resistor 54, is turned on. This blocks gate drive to thyristor 12. Positive latching feedback is provided through a resistor 53 from the anode of thyristor 12 to provide additional base drive for transistor 38. Thyristor 12 remains blocked until the auxiliary winding voltage decreases sufficiently such that negative current I1 exceeds currents I2 plus I3 (the latching feedback current) and transistor 38 turns off again. Then thyristor 12 is again turned on and the output relay 8 is again closed.

The circuit of FIG. 3 is preferred to that of FIG. 2 because it requires two fewer resistors, although one more rectifier, than the circuit of FIG. 2. It also has advantages in having a higher gain with better defined switching voltages for worst case variations and component characteristics. The following are suitable components, presented merely by way of further example, for use in a circuit 124 like that of FIG. 3.

| | |
|---|---|
| Diodes 28, 29, 34 and 44 | 1N647 |
| Thyristor 12 | C106B |
| Transistor 38 | 2N2222A |
| Resistor 51 | 43 kΩ |
| Resistor 52 | 35 kΩ |
| Resistor 53 | 47 kΩ |
| Resistor 54 | 3.9 kΩ |
| Resistor 55 | 82 kΩ |
| Capacitor 32 | 15 µf. |
| Capacitor 40 | 500 pf. |

The embodiments of FIGS. 2 and 3 are examples of starting control circuits which are responsive to the voltage across the auxiliary motor winding 18. Another speed-dependent parameter of the winding 18 is the current as has previously been used in current-sensitive relay circuits. Current may also be used as the operative parameter in circuits in accordance with this invention. The voltage sensing circuits, such as FIG. 3, have an advantage because the winding voltage is more a pure function of motor speed than is its current. The current is more subject to variation in response to the load on the motor than is the voltage.

Figure 4:
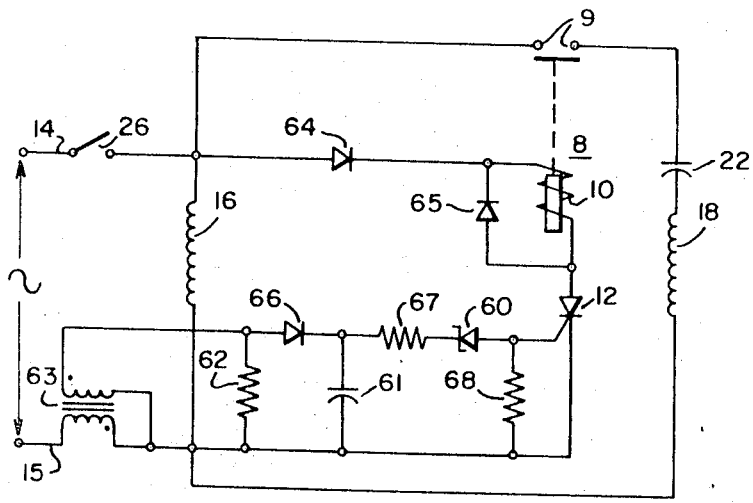

FIG. 4 shows an example of a current-sensing motor control circuit in accordance with this invention. Relay coil 10 and thyristor 12 are in the cooperative relation used in the other embodiments. The gate circuit of thyristor 12 includes a Zener diode 60 that breaks down when capacitor 61 is charged sufficiently. The voltage across resistor 62 is proportional to the primary current of transformer 63. Transformer 63 could be omitted but with some sacrifice in performance. Other illustrated components including diodes 64, 65, and 66 and resistors 67 and 68 complete the circuit.

I claim:

1. A starting control circuit for a single-phase motor comprising: an electromechanical relay having a coil and a pair of contact members serially connected to a motor starting winding; a solid-state switching element connected in series with said coil; circuit means for controlling the firing of said solid-state switching element in response to changes of a motor speed-dependent electrical parameter of said motor-starting winding; said circuit means comprising first means for producing a first rectified current proportional to a single-phase supply voltage, second means for producing a second rectified current proportional to said motor speed-dependent electrical parameter, and means to apply to an electrode of said solid-state switching element a signal representing the difference in magnitude between said first and second rectified currents.

2. The subject matter of claim 1 wherein: said solid-state switching element is a thyristor whose gate is said control electrode and having two main electrodes in series with said coil; and said circuit means maintains said thyristor in a turned on condition and said relay closed when single phase voltage is supplied until said second rectified current is large enough to cause said thyristor to turn off.

3. In combination, a single-phase electric motor having a main winding and an auxiliary winding; solid-state circuit means connected with said auxiliary winding for sensing a speed-dependent electrical parameter across said auxiliary winding; and electromechanical relay connected to be controlled by said solid-state circuit means to permit application of line voltage from a single-phase voltage supply to said auxiliary winding only until occurrence of predetermined motor speed; said solid-state circuit means including a solid-state switching element electrically connected in series with a coil of said electromechanical relay across conductors of the single-phase voltage supply with contacts of said relay electrically coupled in series with the auxiliary motor winding so said relay blocks application of voltage to said auxiliary winding when said contacts are in their open position.

4. The subject matter of claim 3 wherein a voltage divider with variable resistance provides means for selecting pull-in and dropout speeds of said motor.

5. The subject matter of claim 1 wherein latching circuit means is provided within said solid-state circuit means for providing feedback control of the switching characteristics of said solid-state switch.

* * * * *